United States Patent [19]
Berg et al.

[11] Patent Number: 6,002,488
[45] Date of Patent: *Dec. 14, 1999

[54] COMPACT SPECTROPHOTOMETER

[75] Inventors: Bernard J. Berg, Kentwood; Douglas V. Baker, Middleville; David R. Bowden, Grandville; Mark A. Cargill, Belding; Gary T. Kalinka, Wyoming, all of Mich.

[73] Assignee: X-Rite, Incorporated, Grandville, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/714,969

[22] Filed: Sep. 17, 1996

Related U.S. Application Data

[63] Continuation of application No. 08/368,208, Dec. 30, 1994, abandoned, which is a continuation-in-part of application No. 08/305,870, Sep. 14, 1994, abandoned.

[51] Int. Cl.$^6$ .................................................. G01N 21/25
[52] U.S. Cl. ............................................................ 356/418
[58] Field of Search .................................... 356/445–448, 356/402–411, 300, 418, 73, 246, 326, 236, 419; 250/228; 315/311, 185 R, 185 S

[56] References Cited

U.S. PATENT DOCUMENTS

| | | |
|---|---|---|
| 3,490,849 | 1/1970 | Hambleton . |
| 3,554,648 | 1/1971 | Boostrom et al. ...................... 356/326 |
| 4,078,896 | 3/1978 | Moen et al. . |
| 4,093,991 | 6/1978 | Christie, Jr. et al. . |
| 4,096,217 | 6/1978 | Roll . |
| 4,123,172 | 10/1978 | French . |
| 4,396,288 | 8/1983 | Helphrey . |
| 4,540,281 | 9/1985 | Akiyama . |
| 4,583,860 | 4/1986 | Butner ................................. 280/228 X |
| 4,678,914 | 7/1987 | Melrose et al. . |
| 4,915,500 | 4/1990 | Selkowitz . |
| 4,968,143 | 11/1990 | Weston . |
| 4,995,727 | 2/1991 | Kawagoe et al. . |
| 5,016,173 | 5/1991 | Kenet et al. ........................ 364/413.13 |
| 5,062,714 | 11/1991 | Peterson et al. . |
| 5,369,481 | 11/1994 | Berg et al. ........................... 250/228 X |

*Primary Examiner*—K. P Hantis
*Attorney, Agent, or Firm*—Warner Norcross & Judd

[57] ABSTRACT

A portable spectrophotometer includes a rotating wheel provided with a plurality of filters having filter characteristics in the 400 to 700 nanometer wavelength range. The filters are moved between an optical conduit and a photoelectric sensor as the wheel is rotated. In one embodiment, a lamp housing contains three object illuminating lamps circumferentially spaced apart by 120° and projecting light onto the object sample at a 45° angle to the object sample. Light reflected from the object sample is conducted through the optical conduit and focused on the optical sensor by means of a focusing lens. A blocking filter is interposed between the lens and the wheel and serves to block light outside of the 400 to 700 nanometer wavelength range. A side sensor receives light from one of the three lamps through the filters as the wheel is rotated and provides output signals which are used as reference signals for the individual filters. In another embodiment, the spectrophotometer includes an integrating sphere with an aperture for conducting specular-included light reflected from the object and an aperture for conducting specular-excluded light from the object. The integrating sphere spectrophotometer also includes a rotatable filter wheel, with a plurality of filters having filter characteristics in the 400 to 700 nanometers wave length range. A side sensor is also provided with the integrating sphere spectrophotometer. As the wheel is rotated, specular-included and specular-excluded light from an object sample to be tested is projected simultaneously through apertures of the sphere. Light detected by a side sensor is also simultaneously detected through one of the filters of the filter wheel. The integrating sphere spectrophotometer also includes an arrangement for providing calibration and compensation of reflectance measurements.

32 Claims, 11 Drawing Sheets

COMPACT SPECTROPHOTOMETER

This is a continuation of application Ser. No. 08/368,208, filed Dec. 30, 1994 now abandoned. which continuation-in-part of application Ser. No. 08/305870, filed Sep. 14, 1994 now abandoned.

BACKGROUND OF THE INVENTION

1. Field of the Invention

Spectrophotometers are used to measure color of an object by measuring the intensity of light emitted from the object, at a plurality of wavelengths in the visible spectrum which is commonly regarded as falling in the range of 400 nanometers to 700 nanometers. The measured light may be reflected from an object sample or transmitted through it or generated by it, as in the case of a color cathode ray tube.

2. Background Art

The measurement of color has become important in many industries and applications. For example, the color of paint on an automobile on the assembly line is tested to assure consistency. Color measurements are regularly made in color printed materials to assure consistency as well. With the increasing use of color in the desk-top publishing field, there is a need for an inexpensive compact, easy to use spectrophotometer for use in that industry to identify colors and to test for color consistency. Furthermore, color matching has become an important field for the use of spectrophotometers. For example, when damaged areas of an automobile are repaired and repainted, it is important to obtain a nearly perfect match of the new paint with the old. Similarly, in the sale of paints or colored materials for home and other building decorating purposes, it is important to be able to find a color in order to match a specific desired color. Thus, there is a need for compact, easy to use and relatively inexpensive color measuring devices for color identification and matching purposes.

The typical prior art spectrophotometer includes an integrating sphere or a single light source disposed at an angle of 45° to the object sample, a device for selecting various wavelengths from light reflected from or transmitted through the sample, and one or more sensors for sensing light intensity at each of the wavelengths. A signal processing device receives the intensity information and derives spectral data representative of the color of the light received from the object sample being measured. One prior art arrangement for determining intensity at each of the plurality of wavelengths, in common use in present-day Spectrophotometers, is described in U.S. Pat. No. 4,968,143 issued on Nov. 6, 1990. That arrangement uses a diffraction grating by which light is resolved into a diffraction beam covering a wavelength span from 400 to 700 nanometers. The diffraction beam is sampled by a plurality of photocells which are arranged to receive light at various wavelengths at 10 0r 20 nanometer intervals or the like.

Another arrangement for generating light output at the different wavelengths, which seems to have fallen in disfavor in modern spectrophotometers, is described in U.S. Pat. No. 4,093,991 issued on Jun. 6, 1978. This arrangement comprises a rotatable, variable interference filter wedge monochrometer which is rotated at a constant speed by a synchronous motor. The system response at any angular position of the rotatable variable wedge monochrometer is proportional to the light emitted by the specimen at particular wavelengths of light passed through the wedge at the angular position in question. As the monochrometer is rotated, various monochromatic beams are projected onto an electro-optical detector. The wavelength passed by each angular position of the wedge is identified by a shaft decoder, which transmits pulses relating to the rate of rotation of the monochrometer wedge. A signal processor derives information regarding angular position of the wedge from the pulses to identify the wavelength of the light passed by the wedge.

A problem with the prior art devices is the cost and size of the apparatus for providing signals indicative of intensity at each of the various wavelengths of interest along the spectrum. This is true for the prior art arrangement using the diffraction grating and a multiplicity of detectors as well as for arrangements using the variable interference filter wedge-type device for providing monochromatic light beams at different wavelengths.

Integrating spheres are used in spectrophotometers and are known to provide an average reading of color over an exposed surface area. The integrating sphere is preferably used with reflective surfaces since the specular component of light reflected from a glossy surface may be insulated and subtracted from the color readings in order to obtain a more accurate indication of the color of the object to be measured. One such prior art integrating sphere is disclosed in U.S. Pat. No. 5,369,481 issued on Nov. 29, 1994. One problem with prior art integrating spheres is that light is conducted from an aperture by means of a bundle of optical fibers terminating on a plurality of filter elements in which each filter element is designed to pass only light of a selected wavelength in the visible spectrum. Transmitting light via a bundle of optical fibers has a disadvantage in that the light is typically not evenly distributed over the bundle of fibers resulting in an uneven distribution of light projected on the various filters of different wavelengths. Another disadvantage of light measurements by means of an integrating sphere is that it is often necessary to obtain a reading of the source light incident of the object sample in order to compensate for variations and diffuse light striking the sample and changing the readings obtained from the sample.

SUMMARY OF THE INVENTION

These and other problems of the prior art are overcome in accordance with this invention by means of a spectrophotometer comprising a rotating wheel provided with a plurality of individual filters, spaced apart along the periphery of the wheel and driven by an electric motor. The individual filters each pass light of a predefined wavelength onto a single photodetector and the signal derived from the photodetector is integrated over a period of time provide an output signal representative of the intensity at the particular wavelength passed by the filter.

In accordance with one aspect of the invention, the relative position of the filters with respect to the detector is determined by detecting the significant difference in intensity between light passed through the low wavelength filter (e.g. 400 nanometers) and the high end filter (e.g. 700 nanometers). Since the characteristic wavelength of each filter and the number of filters is known, it is easily determined by means of a signal processing device, such as a microprocessor, when a particular wavelength filter is in alignment with the detector.

In accordance with one particular aspect of the invention, the test specimen is illuminated by a plurality of lamps arranged in a particular fashion to simultaneously illuminate the specimen. In one particular embodiment, a set of three illuminating lamps is used which are spaced apart by 120 degrees and disposed at a 45 degree angle to the test specimen and the light receptor to cause light to be reflected from the specimen into the receptor. The three lamps are preferably each provided with a collimating lens to project collimated light onto the specimen in an overlapping area of the specimen. Furthermore, a collimating tubular housing provided with a plurality of interior baffles is preferably used to direct the reflected light through the filters of the filter wheel and onto the detector. Advantageously, this arrangement provides a significant insensitivity to depth of field which allows for more accurate reading of color on rough paper, such as newsprint, as well as transparent inks.

In accordance with one aspect of the invention, a light-conduction channel is provided between a specimen illuminating lamp and a filter in the filter wheel to allow for accurate determination of the intensity of the supplied light received through the filters (as the filter wheel is rotated). In one particular embodiment invention, a lamp compensation circuit compensates for variations in the intensity of the light produced by a plurality of lamps.

In accordance with another aspect of the invention, the individual filters providing monochromatic light at the various wavelengths are nonhygroscopic filters which do not require encapsulation and, therefore, can be more compactly mounted on the filter wheel. In one embodiment of the invention, the individual filters are rectangular in shape and each is retained within an individual retainer portion of the wheel and covered with a snap cover provided with an opening to allow for the passage of the light beam. Advantageously, the rectangular-shaped filters are considerably cheaper to manufacture than the standard round filters and the individual retainers with snap covers on the wheel simplify assembly and shipment of the filters and wheel and allow for individual replacement of a particular filter in the event that the filter is defective.

In accordance with another aspect of the invention, the light reflected from an object sample under test is filtered through a common blocking filter before the light reaches any of the filters in the filter wheel. The blocking filter preferably filters all light at wavelength outside of the 400 to 700 nanometers range. Advantageously, this arrangement allows for the use of less expensive filters is the filter wheel.

In one embodiment of the invention, an integrating sphere is used in combination with a rotating filter wheel provided with a plurality of filters. The integrating sphere is provided with a specular-included (spec-in) aperture and a specular-excluded (spec-ex) aperture and the apertures are spaced apart and aligned with filters of the filter wheel such that the spec-in and spec-ex components of reflected light are received simultaneously through two separate filters. In this manner, both spec-in and spec-ex are simultaneously read at each of the various wavelengths defined by the filters, as the wheel is rotated. Advantageously, the sphere and filter wheel are compact and inexpensive devices which drastically reduces the cost of color measuring devices such as may be used at point of sale in paint stores. The present instrument allows an immediate and accurate analysis of any small paint sample, independent of gloss. This is particularly important with certain inks which create a "bronzing." Advantageously, the instrument of the present invention provides a simultaneous reading of specular-included and specular-excluded light at all specified wavelengths and allows for automatic, highly accurate, spectral measurement of color independent of the amount of surface gloss. The spectral analysis made possible by this device provides the basis for a computerized definition of colors to be mixed in order to obtain the desired color combination.

In accordance with another aspect of the invention, calibration and compensation means are provided for compensating color measurements of the object to be tested for variables associated with mechanical, electrical and optical components of the apparatus. The calibration and compensation means comprises means for adjusting signal strength measurements for amplifier and motor offsets. The calibration and compensation means also includes means for calculating scale factors associated with specular-included and specular-excluded reflectance values for given wavelength intervals, based on reference sample measurements and measurements in the absence of a projected light source. Still further, the calibration and compensation means includes means for calculating specular-included reflectance values and specular-excluded reflectance values as a function of actual calculated scale values, reflectance measurements, amplifier offsets and motor offsets.

BRIEF DESCRIPTION OF THE DRAWINGS

The invention will now be described with reference to the drawings wherein.

DETAILED DESCRIPTION

Figure 1:
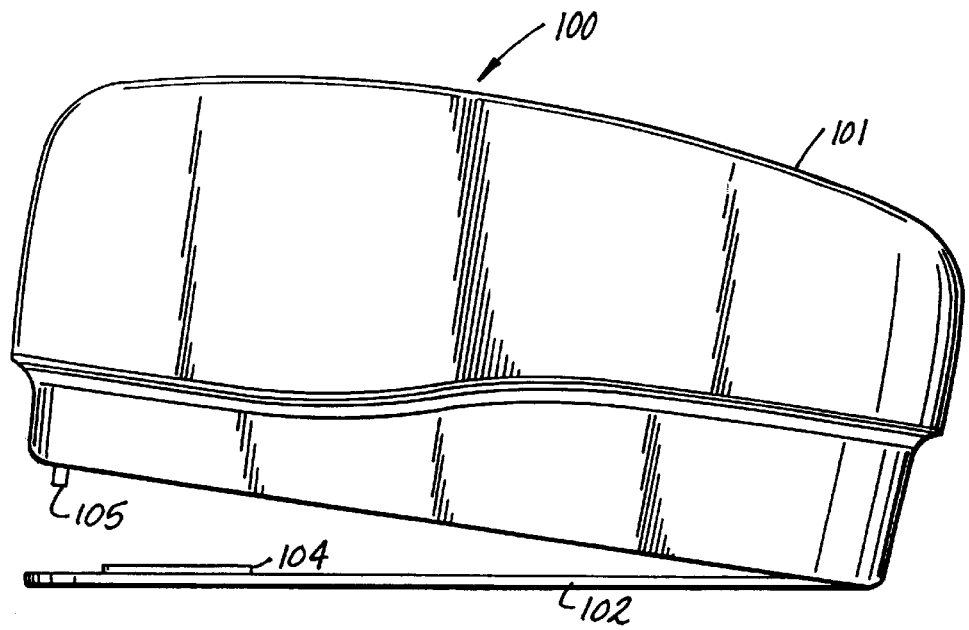
FIG. 1 is a perspective view of a compact spectrophotometer incorporating principles of the invention.

FIG. 1 is a perspective view of a compact, portable spectrophotometer 100 incorporating principles of the invention. The spectrophotometer includes a housing 101 containing the optics and electronics for performing color measurements of object samples and a shoe 102 hingedly attached to the housing 101. A plunger 105 disposed near one end of the housing 101 activates a read switch when the housing 101 is pivoted to a position immediately adjacent to the shoe. The shoe 102 is provided with a removable aperture 104 for alignment of the sample under test with the instrument's optical path. An object sample to be tested for color is placed under the shoe 102 and aligned to the aperture 104. Thereafter, the housing 101 is pivoted in the direction of the shoe, causing the plunger 105 to be actuated and initiating a measuring sequence. The measuring sequence includes illumination of the object sample through the aperture 104 by means of a plurality of lamps inside the housing 101 and the rotation of a filter wheel provided with a plurality of filters each specifically adapted to measure a particular wavelength. In one embodiment of the invention, 16 such filters are provided to measure light at different wavelengths from 400 nanometers to 700 nanometers, at 20 nanometer intervals. More or fewer filters may be employed, depending upon the desired degree of accuracy in the color measurement. Light reflected from the object sample is conducted via the aperture 104 through an optical system and the filters of the filter wheel and onto a photoelectronic detector which provides an analog output indicative of the intensity of the received light. The analog output of the detector is integrated over time to generate an output signal indicative of total light received through a particular filter. The resulting signal is computed by means of standard signal processing techniques using a microprocessor, in a well known fashion to derive optical data which can be used to derive tristimulus colormetric system values or other standard color scale values. The system includes a side sensor by which the light level of at least one of the illuminating lamps is monitored through the filters of the filter wheel. The output of the side sensor is used to compensate for variations in light intensity.

Synchronization of the signal processing circuitry with filters in the wheel is accomplished by monitoring, for at least one rotation, the magnitude of light received via each of the filters and comparing the light output until a substantial change in light output occurs, e.g., from a relatively high level to a significantly lower level. This indicates the transition from the higher wavelength filter to a lower wavelength filter, e.g. from the 700 nanometer wavelength filter to the 400 nanometer wavelength filter. The relative position of other filters on the wheel is derived from information stored in a microprocessor memory, such as a ROM.

The spectrophotometer of the present invention may be used for a number of applications besides the measurements of reflectance. It will be apparent that transmittance may also be readily measured by providing an appropriate light source on the opposite side of the sample to be measured, which light is transmitted through the sample and through the filters of the filter wheel onto the photodetector. In another application, the device may be used as a strip reading spectrophotometer by providing a mechanism for automatically advancing a color strip adjacent the aperture 104 by means of a strip advancing mechanism such as described in U.S. Pat. No. 5,062,714 to Peterson et al. or co-pending application Ser. No. 08/045859 filed Apr. 12, 1993, now U.S. Pat. No. 5,369,494 to Bowden et al. using the method for pattern recognition described in Peterson et al. Furthermore, the present device may be used to determine color on a cathode ray tube (CRT) by positioning the device over an area of the CRT and measuring a color at various wavelengths of the different phosphor mixtures used in the CRT. When the device of the present invention is used to measure color in a CRT, the illumination lamps provided in the device may be used for synchronization purposes and turned off during color measuring operation.

Figure 2:
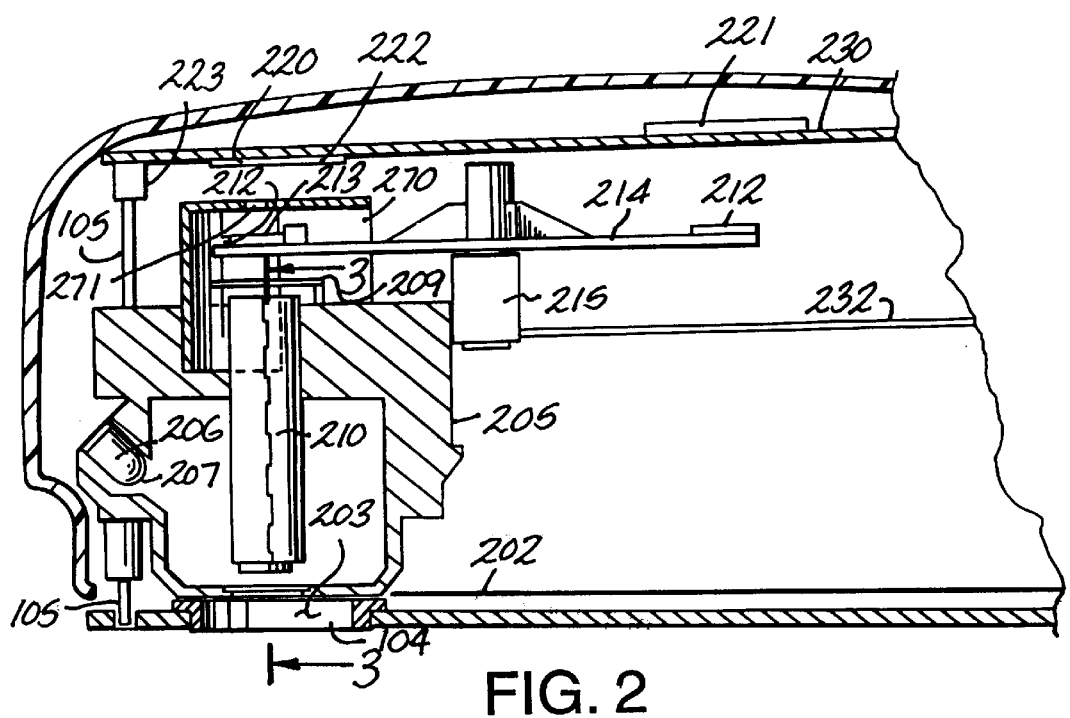
FIG. 2 is a partial cross-sectional view of the spectrophotometer of FIG. 1 showing certain of the basic elements of the invention.

FIG. 2 is a partial cross sectional representation of a portion of the spectrophotometer 100 of FIG. 1. In FIG. 2, the shoe 102 is shown immediately adjacent the lower wall 202 of housing 101. The lower wall has an opening 203 in alignment with the aperture 104 in shoe 102. FIG. 2 further shows a lamp support housing 205 which supports a set of three lamps 206 circumferentially spaced apart by 120°. Each of the lamps 206 is arranged at a 45° angle to a vertical direction and illuminates an object sample placed under the aperture 104 such that the light is reflected in the vertical direction from the object sample. The reflected light is conducted through a light path including a cylindrically shaped conduit 210 and a common blocking filter 209 to an interference filter 213, retained in filter housing 212 disposed in alignment with conduit 210. Light projected through the filter 213 is projected onto a photodetector sensor 220. A side sensor 222 is provided to sense a reference beam. These sensors may be any of a number of well know photodetectors typically used in colorimeters. The sensors 220 and 222 are mounted on a circuit board 230. The circuit board 230 also supports a microprocessor 221 and a read switch 223 which is activated by the plunger 105. Additionally, the circuit board 230 is provided with interconnecting wiring between these units and the various other components of the system. A light shield 270 serves to shield the filters from extraneous light. The shield 270 is provided with openings 271, 273 in register with sensors 220 and 222, respectively.

The filter housing 212 is mounted on a filter wheel 214 which comprises a number of such filter housings 212. The filter wheel 214 is driven by an electric motor 215 mounted indirectly to the lamp support housing 205. The motor 215 and lamps 206 are electrically connected to the circuit board 232 and receive power from a battery or external power source (not shown in the drawing) via board 232. The circuit boards 230 and 232 are electrically interconnected and operation of the motor 215 and the lamps 206 are controlled by the microprocessor 221 in conjunction with the read switch 223 on board circuit 230. Each of the lamps 206 projects light through the aperture 104 at a 45° angle to a vertical axis extending through the light conduit 210 and filter 213. Each of the lamps 206, is provided with a collimating lens 207 to provide collimated light to the object sample. The lamps 206 are preferably single element lamps which project elliptical beams. The lamps are arranged within the housing 205 such that the longitudinal axes of the three lamps intersect at a plane below the lower surface of the aperture 104 to assure ample illumination at the reading surface adjacent the lower surface of the aperture 104. By placing the focal plane below the reading surface, ample illumination is provided at a distance below the reading surface. Because the incident light is collimated, the reflected light tends to be collimated to some degree as well. The reflected light is collimated by the light conduit 210 directing the reflected light to the filters.

Figure 3:
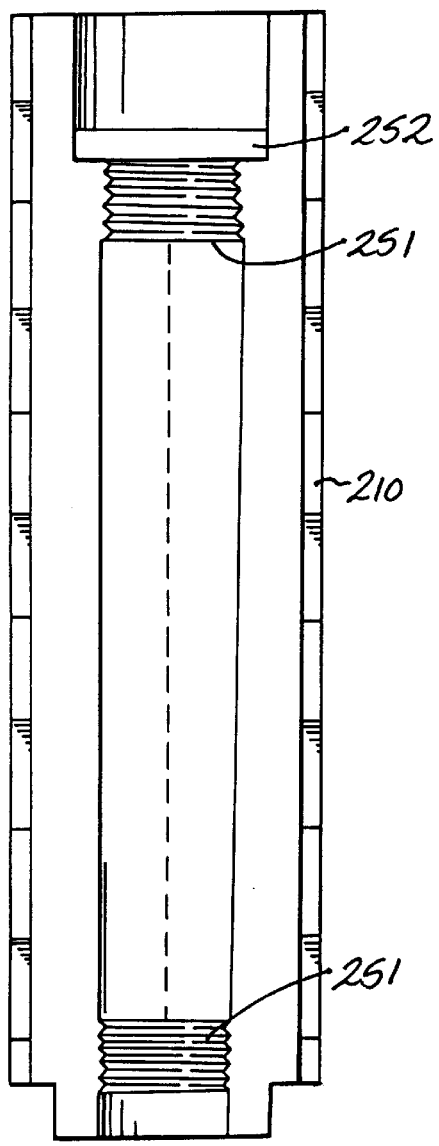
FIG. 3 is a elevational view of a one half section of an optical conduit shown in FIG. 2.
Figure 4:
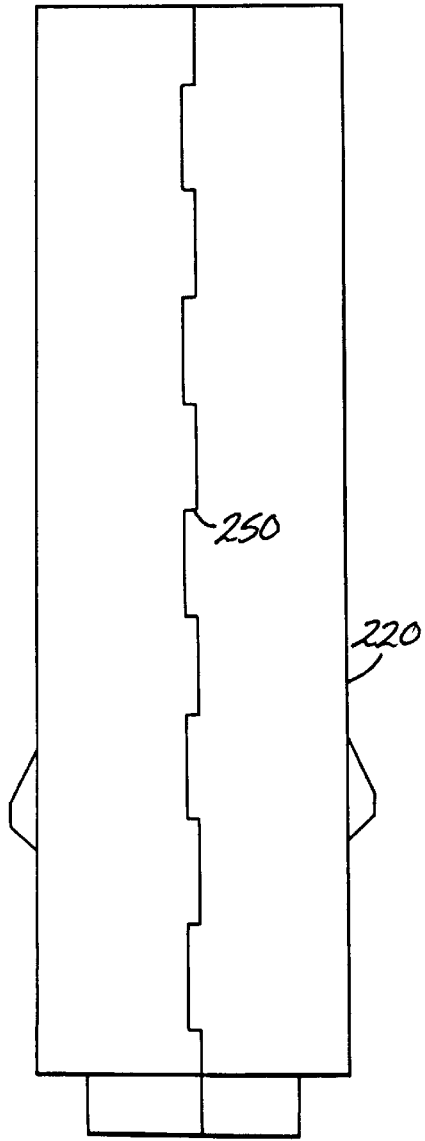
FIG. 4 is an elevational view of an optical conduit shown in FIG. 2.

The light conduit 210 is shown in greater detail in FIGS. 3 and 4. The optical conduit is preferably made out of two molded halves which are joined along their sides by means of a snap fit as generally depicted at 250 in FIG. 4. Each half is provided with a plurality of circumferentially extending baffles 251 as shown in FIG. 3. The circumferential baffles serve to further collimate the light reflected from the object sample by absorbing stray radiation. The conduit 210 is further provided with a lens 252 having a relatively short focal length. The lens 252 provides a high intensity light beam to each of the filters 213 and the photodetector 220 (shown in FIG. 2) and serves to reduce edge leakage in the filters 213.

Figure 5:
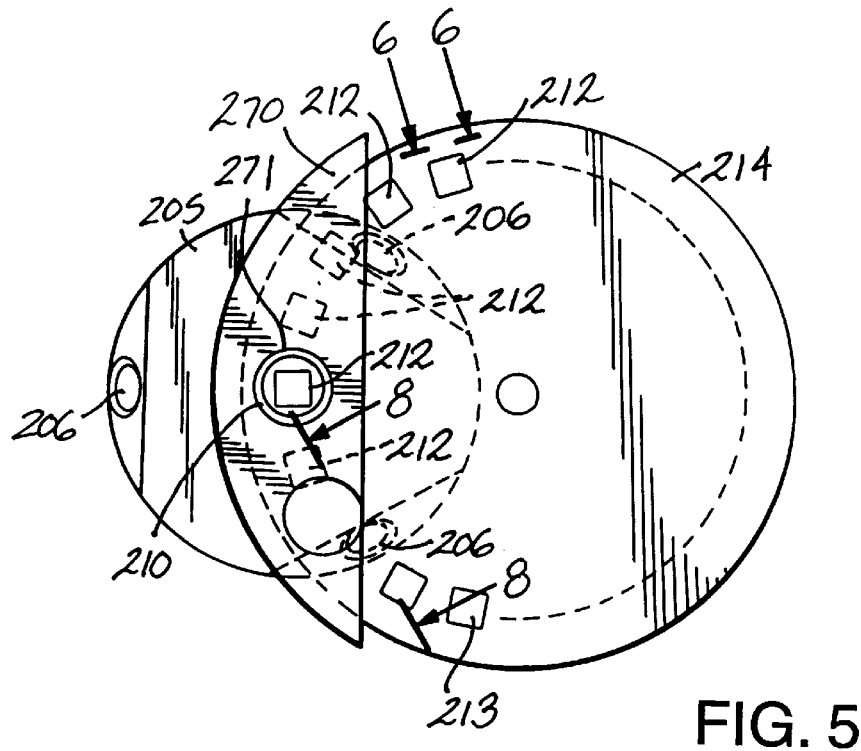
FIG. 5 is a diagrammatic representation of a filter wheel and lamp housing employed in one embodiment of the invention.

FIG. 5 is a top view of the filter wheel 214 showing a plurality of filter retainers 212, each comprising one filter 213. The filter retainers 212 are rectangularly shaped, preferably square, and the filters 213 are square as well. The filters 213 are produced in a well know manner by the deposition of oxides on different kinds of glass to obtain filters which pass light at the desired wavelength only. For example, rare earth oxides may be deposed on a glass sheet and cut into rectangularly shaped filter elements. The filter elements are then made into circular shapes by a grinding operation. In one embodiment of the invention, the filter retainers 212 are square and the filter elements 213 are square elements, thereby avoiding the customary grinding operation. Furthermore, rectangularly shaped filters may be more readily made in small dimensions. This is advantageous for the present application, where the objective is to make the filter wheel and the entire spectrophotometer as a compact and relatively inexpensive unit.

Figure 6:
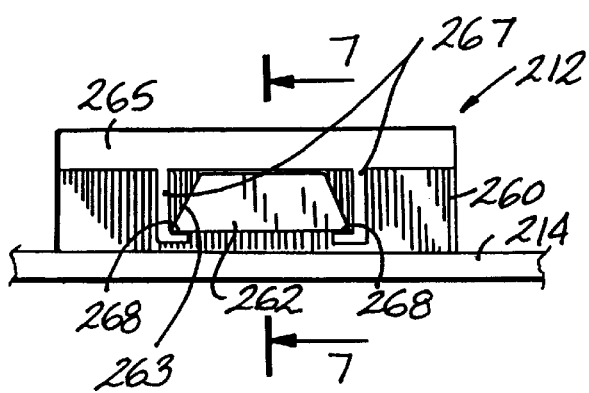
FIG. 6 is a breakaway side view of a portion of the filter wheel showing a filter housing.
Figure 7:
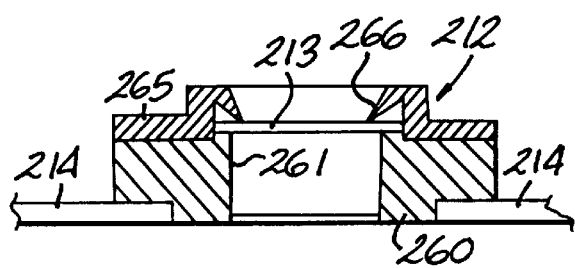
FIG. 7 is a cross-sectional view along line 7—7 of FIG. 6.

FIG. 6 is a breakaway end view of a portion of the wheel 214 and an end view of the filter retainers 212. FIG. 7 is a cross-sectional view of the retainer 212 along line 7—7 of FIG. 6. The retainer 212 includes a lower housing 260 provided with an annular shoulder 261 on which the filter 213 is supported. A cover 265 is provided with an annular flange 266 extending over the shoulder 261 and a portion of the filter 213 to retain the filter in the desired position. The cover 265 is retained on the housing 260 by means of a snap fastener arrangement. The snap fastener arrangement includes a pair of arms 267 formed integral with the cover 212, each provided with a perpendicularly extending lip 268 which engages a retainer 262 on the lower housing 260. The retainer 262 is provided with upper slanting surfaces 263 to force the arms 267 apart when the cover 265 is pressed onto the housing 260. The retainer 262 is further provided with shoulders 264 which engage perpendicularly extending sections 268 of the arms 267. By this arrangement, individual interference filters 213 are firmly retained on the filter wheel 214 in the presence of centrifugal forces exerted on the filter and designed to withstand normal handling of the portable, hand-held instrument, and are individually removable. Furthermore, the present arrangement serves to seal the edges of the filters, to prevent light from bypassing the filters.

Figure 8:
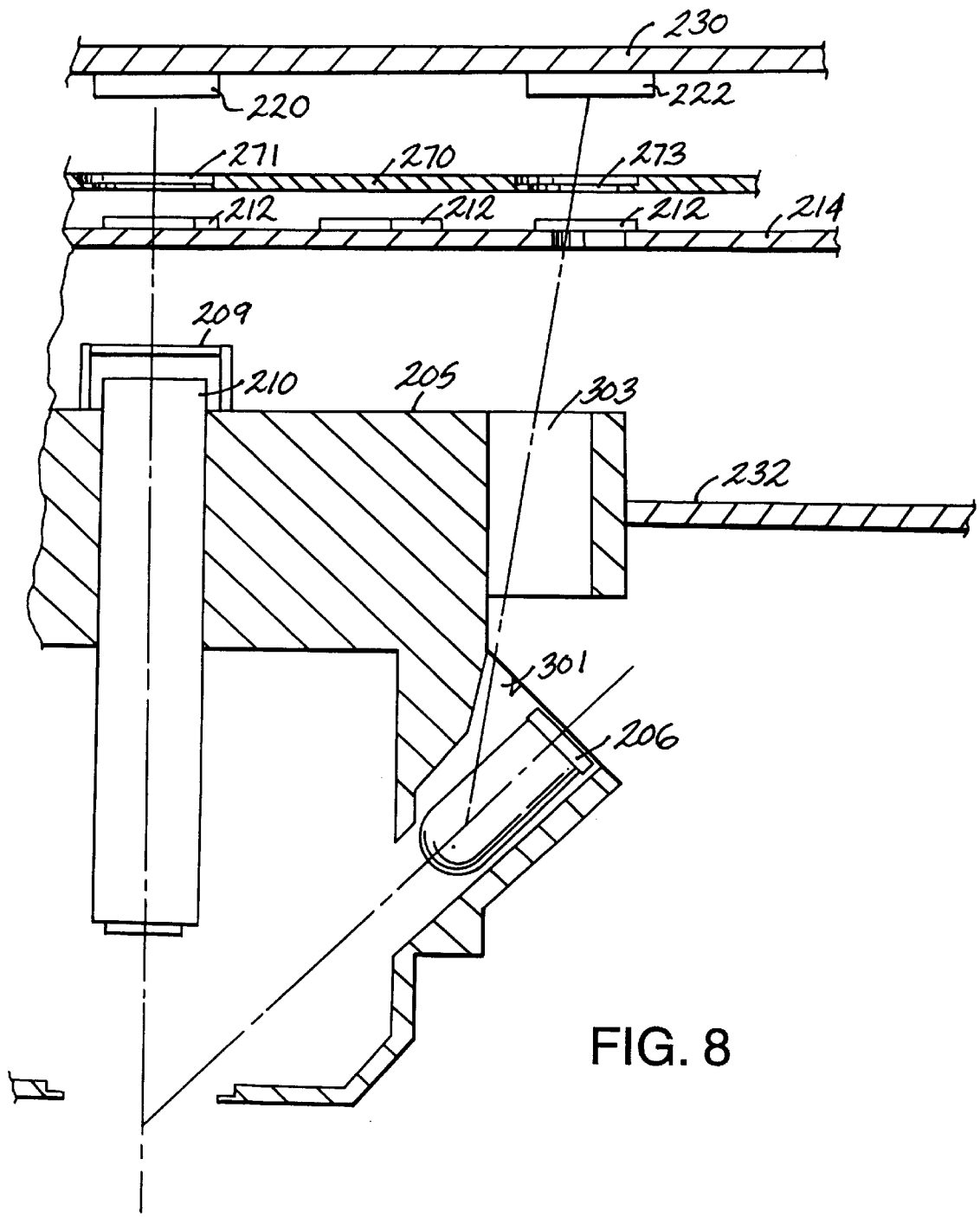
FIG. 8 is an enlarged breakaway partial cross-sectional view of the lamp housing shown in FIG. 2

FIG. 8 is a breakaway partial cross-sectional view showing a portion of the lamp housing 205 and one of the lamps 206. As stated earlier, the lamp housing comprises three lamps 206 which are circumferentially spaced apart by 120°. One of the lamps 206 is preferably positioned in alignment with a longitudinally extending center line through the device 100. That lamp is shown in cross-section in FIG. 2. FIG. 8 shows a lamp 206 spaced apart from the lamp shown in FIG. 2 by 120° in the counter-clockwise direction as one views the instrument shown in FIG. 1 from an upper position. The lamp housing 205 is provided with a flat surface area 301 to facilitate installation and positioning of the lamps 206 within the lamp housing. Also shown in FIG. 8 is a portion of the filter wheel 214 and of the circuit board 230. The filter wheel shows three of the filter housings 212 spaced circumferentially along the wheel 214. For the sake of clarity, only these three filter housings 212 are shown. As discussed earlier, light reflected from an object sample is conducted through the optical conduit 210 and through one of the filters 212 and is received by an electro-optic sensor 220, shown in alignment in FIG. 8.

It is a common practice in the design of colorimeters with an integral light source to obtain a reference beam from the light source for the purpose of deriving a reference signal. The reference signal is used in conjunction with a signal derived from the reflected beam to generate spectral data. Furthermore, the intensity of the light source is typically monitored to compensate for variations in intensity occurring over time.

In accordance with one aspect of the present invention, the reference beam is derived from one of the lamps 206 through each of the filters 212 which are provided on the filter wheel 214 for the purposes of filtering the light reflected from the object sample under test. As shown in FIG. 8, the lamp housing 205 is provided with a slanted bore 302 in the housing 205 adjacent one side of the lamps 206. A vertically extending bore 303 in the housing 205 serves to provide a path for the light to be projected from the lamp 206 through a filter housing 212 of wheel 214 onto the side sensor 222. The relative position of the filter housings 212 on the filter wheel 214 is dictated by the number of filters used, e.g., 16 or another desired number. Furthermore, the position of the illuminating lamps from which the referenced light is detected is dictated by the preferred angle of the lamp and preferred distance of the lamp from the object sample. The slanted bore 302, shown in FIG. 8, is provided adjacent the lamp 206 to direct light to the vertically extending bore 303. These bores are positioned to allow for projection of light from the lamp 206 through the bore 302 onto a filter in a selected one of the housings 212. The side sensor 222 is positioned in alignment with the housing 212 selected to receive the light from the lamp 206. In the present arrangement, the housing 212 selected for receiving the direct light from the lamp is two positions removed from the housing 212 which receives the reflected light from optical conduit 210 and which is directed onto the sensor 220. Thus, the reference beam, used in the computation of light intensity reflected from the object sample, is detected through a filter at a wavelength somewhat outside of the range of the filter through which the reflected light is received. This allows for greater accuracy of measurement. Furthermore, the reference beam is generated in synchronism with the reflected test beam since they are received simultaneously through filters on the rotating filter wheel 214.

Figure 9:
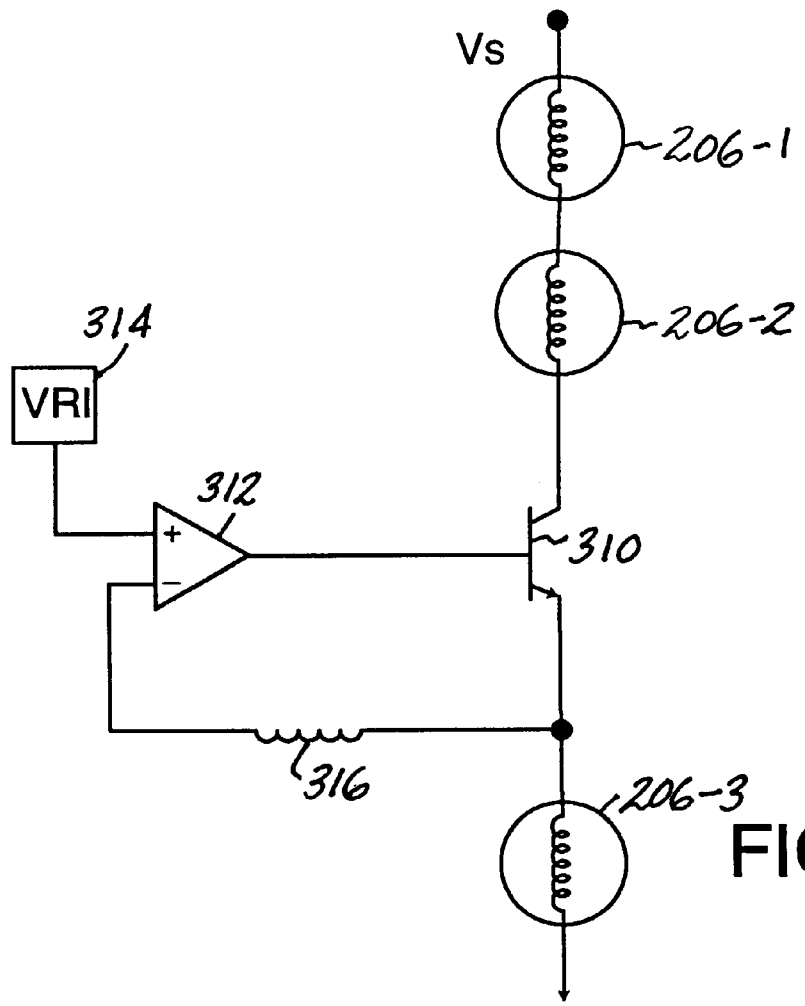
FIG. 9 is a circuit diagram representation of a lamp driver circuit.

FIG. 9 is a circuit diagram representation of the lamp driver circuit which drives the three separate lamps 206 mounted in the lamp housing 205, as shown in FIGS. 2 and 8. The three separate lamps are designated as 206-1, 206-2 and 206-3 in FIG. 9. The current through the lamps is regulated by the transistor 310 from a differential amplifier 312 which has one input connected to a reference voltage signal generated by voltage reference source 314. The other input of the amplifier 312 is connected to the positive voltage side of lamp 206-3 through a feedback resistor 316. The three lamps 206 are matched for light output versus current such that equal currents in the three lamps cause the lamps to produce equal and balanced light output. Since the three lamps are series connected, as shown in FIG. 9, a substantially identical current will flow through all three lamps. The differential amplifier 312 and the feedback resistor 316 serve to maintain a constant voltage at lamp 206-3. Since the three lamps are selected to have substantially identical characteristics, it is safe to assume that changes due to aging or drifting will be nearly the same for all three lamps. Therefore, it is only necessary to monitor light output from one of the lamps, preferably the regulated lamp 206-3. In the present embodiment, the lamp 206 shown in FIG. 8, from which light is projected through the slanted bore 302 and the vertically extending bore 303 onto side sensor 222, is the regulated lamp.

Figure 11:
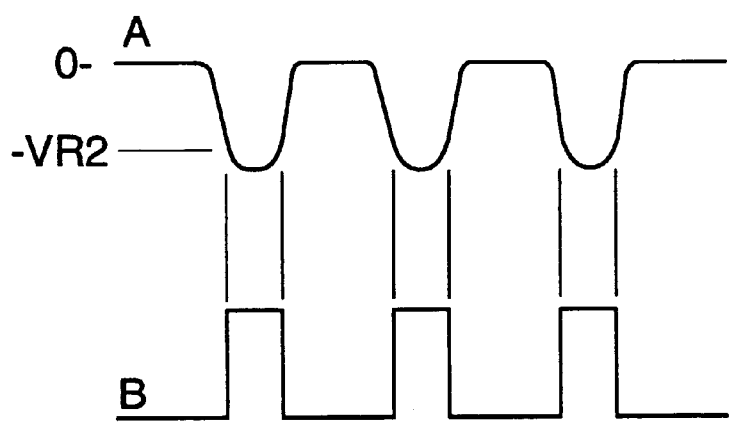
FIG. 11 is a diagrammatic representation of signals generated in the circuitry of FIG. 10.
Figure 10:
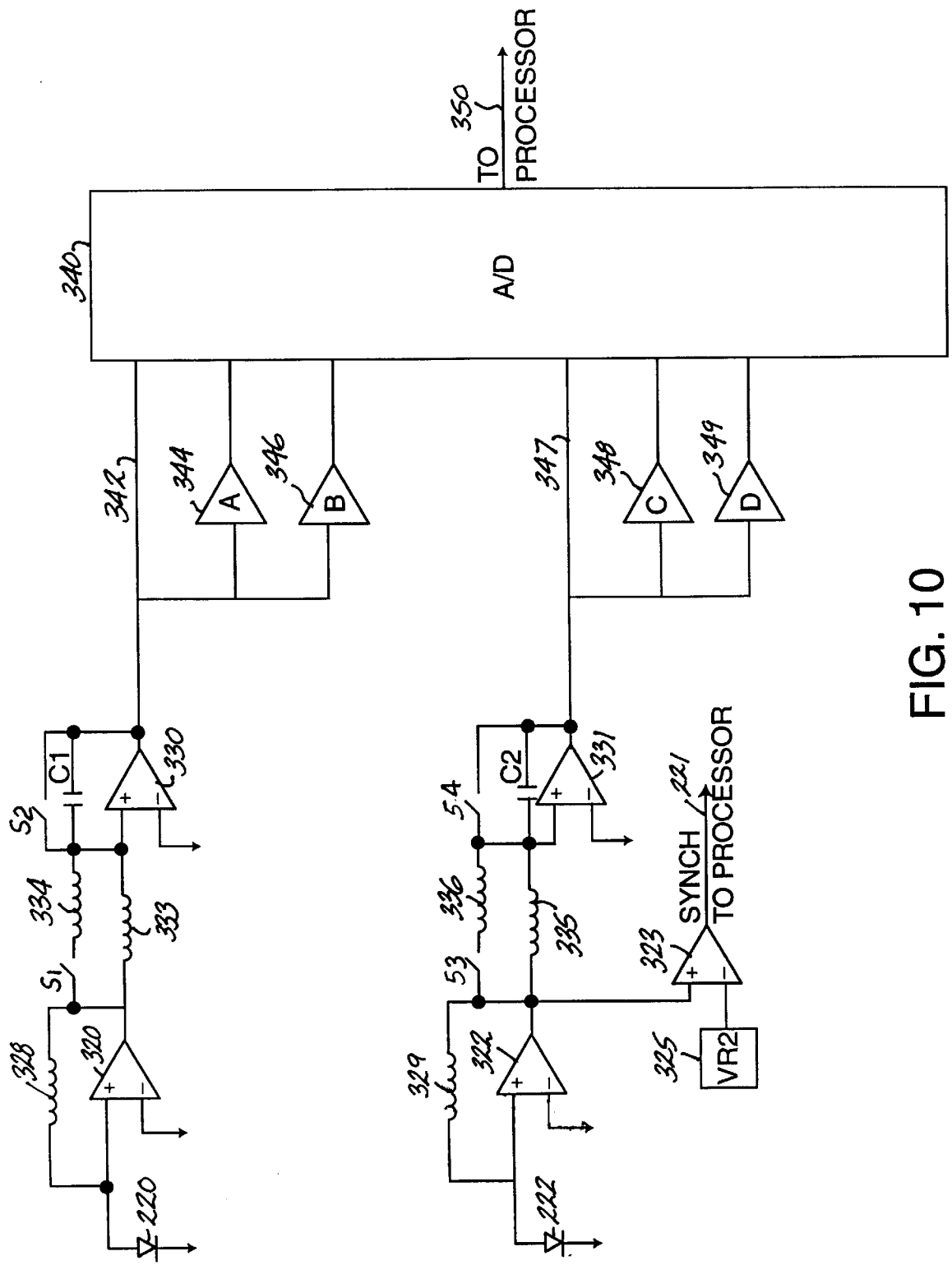
FIG. 10 is a circuit diagram representation of signal processing circuitry.

FIG. 10 is a circuit diagram representation of signal processing circuitry connected to the primary sensor 220 and the side sensor 222. The sensors 220 and 222 are shown in FIG. 10 in a photodiode representation having one side connected to ground. The sensor 220 is connected to one input of operational amplifier 320 and sensor 222 is connected to an input of operational amplifier 322. Light from the lamp 206-3 is projected through the filters 213 onto the detector 222 as wheel 214 is rotated. The amount of light which passes through the filter onto side sensor 222 first increases and then decreases as the filter moves into the light path and then out of the light path due to the rotation of the wheel. This produces an electrical output signal for each filter as it passes the lamp 206-3. The signal from side sensor 222 is amplified by means of operational amplifier 322 and applied to one input of a comparator 323. The other input of comparator 323 is connected to a reference voltage source 325 providing a voltage VR2 to comparator 323. FIG. 11 is a signal diagram representation of the signals generated by operational amplifier 322 and comparator 323. The output signal of operational amplifier 322 is a negative going signal varying between ground level and a magnitude below ground level, as shown in FIG. 11 at A. When the magnitude of the signal generated by operational amplifier 322 exceeds that of the reference voltage VR2, the comparator 323 generates a positive output signal. FIG. 11 shows the output signal of comparator 323 at B. When the output of operational amplifier 322 falls again to a magnitude less than the negative voltage VR2, the output signal of the comparator 323 returns to the prior state. A series of pulses generated by the comparator 323 as a result of the rotation of filters passing the lamp 206-3 is transmitted to the processor 221 as synchronization pulses.

The signal produced by the primary sensor 220 in response to light reflected or emitted from an object under test is applied to an input of operational amplifier 320 and to integrator circuit 330 connected to operational amplifier 320. Operational amplifiers 320 and 322 are each provided with standard feedback resistors 328 and 329, respectively. A pair of resistors 333 and 334 are connected in parallel between the output of the operational amplifier 320 and the input of the integrator circuit 330. Furthermore, a switch S1 is connected in series with the resistor 334 to provide a variable resistance path between the operational amplifier 320 and integrator 330. A capacitor is connected between the input terminal of integrator 330 connected to operational amplifier 320 and the output of integrator circuits 330. A switch S2 is provided in parallel with the capacitor C1 to allow the capacitor C1 to be effectively removed from the circuit. The output of the integrator 330 is connected to an analog-to-digital (A-to-D) convertor 340 having an output connected to the control microprocessor 221. Three parallel paths are provided between the output of the integrator 330 and the A-to-D convertor 340 including a first path 342 representing a direct connection without further gain. A second path connected in parallel with the path 342 includes an amplifier 344 of a predetermined gain and a third path includes an amplifier 346 having a different gain than the amplifier 344.

The output of operational output 322 is connected through a pair of parallel resistors 335 and 336 to an input of integrator circuit 331. A switch S3 is provided in series with the resistor 336 to allow for a variable resistance to be provided between the operational amplifier 322 and the integrator 331. A capacitor C2 is connected between the input and output of the integrator 331. A switch S4 is connected in parallel with the capacitor C2 to allow the capacitor to be discharged. The output of integrator 331 is connected to the A to D convertor 340 via a first path 347 in which no gain is provided. A second path including amplifier 348 having a predefined gain and a third path including amplifier 349 having a different value of gain are connected in parallel with the first path 347 into the A to D convertor 340. The A to D convertor 340 includes multiplex circuitry which multiplexes the signals from the paths 342 and 347 and the paths including amplifiers 344, 346, 348 and 349. The multiplexed signals are converted to digital signals on output 350, which is connected to the processor 221. The switches S1, S2, S3 and S4 may be transistors or other switching elements operable in response to pulses from the processor 221.

When the color measurements cycle is started by operation of the read switch 223 (FIG. 2), the processor 221 initiates rotation of the motor 215. During one of the first rotations, the amplitudes of the signals from the two sensors 220 and 222 are sampled to determine the correct settings for switches S1 and S3 and also to determine whether the no-gain paths 342, 347 or the outputs of any of the gain amplifiers 344, 346, 348 and 349 will be used. These determinations may be based on an optimization routine to achieve the best signal-to-noise ratio for each of the filters 213. Thereafter, measurements can be made to determine the proper gain setting for the integrators 330 and 331 along with the selection of gain amplifiers 344, 340, 346, 348 and 349, again based on best signal-to-noise ratios. The information relating to the optimum settings for each of the filters is recorded in memory and just before a particular filter passes through the light path aligned with the sensor 220, the switches S1 and S3 are set according to that filter's sensitivity and the switches S2 and S4 are opened to allow the integrator circuits 330 and 331 to charge capacitors C1 and C2, respectively, to a voltage level that is proportional to the total amount of light passing through the particular filter as it moves through the primary sensor light path and the side sensor light path. After a filter has passed through a light path, the light path will be blocked by a portion of the wheel 214 extending between adjacent filters. During this time period, the voltage on the integrators 330, 331 will be held at a level which represents the magnitude of the light through the filter which has just been passed through the light path. The output state of the integrators 330 and 331 are sampled by the A to D convertor 340. After a period of time sufficient for appropriate sampling, switches S2 and S4 are closed under control of the processor 221 to reset the voltage of the integrator circuits 330 and 331 to a known level. This cycle is repeated for each filter as it passes through the light path aligned with the side sensor 222 and as it passes through the light path aligned with the primary sensor 220. It is noted that the integrate, hold and A-to-D conversion cycle can in many cases be completed in the time periods between alignment of two consecutive filters with the light paths. This allows measurement of the system with the light path blocked. Such measurements may be used to subtract offset errors in the circuit and the optical system. Advantageously, because the integrated hold circuitry of FIG. 10 samples all of the light that passes through the filter as it rotates, the design is insensitive to speed variation. Whether the speed increases or decreases, all light will still be integrated by both detectors 220 and 222. Thus, compensation can be made for variations in light intensity from the lamps 206 independent of the speed rotation of the wheel.

In one embodiment of the invention, the motor 215, which is used to accelerate the wheel from a stopped position and to maintain the wheel at a constant speed, is a stepper motor. The mass of the wheel 214 requires a speed-up ramp in order for a small motor to properly start the wheel rotating and achieve the desired speed within a desired time period. The stepper motor is driven by a conventional two or four-phase stepper motor drive responsive to input pulses from processor 221. The frequency of the input pulses is preferably increased in a non-linear fashion to start the motor rotating in the correct direction and to achieve the desired speed. A conventional DC or AC brush or brushless motors could also be used.

While most of the foregoing description was made with reference to the detection of reflected light, the present device may also be used to measure incident light such as produced, for example, by a cathode ray tube CRT. The procedure for determining the correct settings of the switches S1 and S3 and the selection of the gain paths including the gain amplifiers 344, 346, 348 and 349, when measuring incident light is accomplished by initially turning on the lamps 206 and taking measurements through each of the filters to determine a position of each wavelength filter from the intensity of the received light. Thereafter, the lamps 206 may be turned off and the steps of the stepper motor may be counted in a known fashion to keep track of the position of each of the filters. In this manner, incident light from a CRT or the like can be measured at predetermined wavelengths by taking into account only the output of the specific filters pertaining to the wavelengths of interest.

The principles of the invention relating to the use of a rotating wheel having spectrally separated filters may also be employed in other types of spectrophotometers, such as spectrophotometers employing integrating spheres. Such spectrophotometers may be employed for specific commercial applications, such as color paint chip analysis in retail stores or the like.

Figure 12:
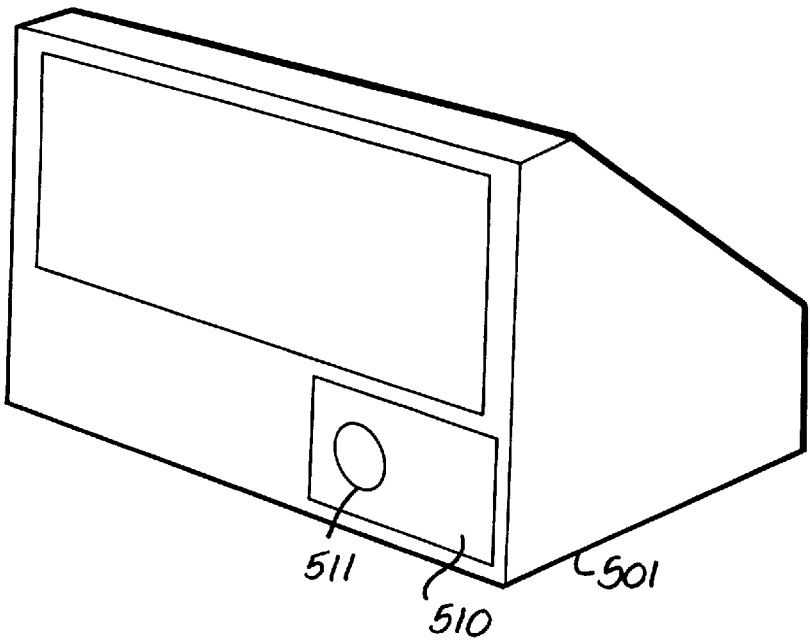
FIG. 12 is a perspective view of a computer terminal incorporating an integrating sphere spectrophotometer.

For example, FIG. 12 is a perspective representation of a computer terminal 501 such as may be used at the point of sale in a paint department or other areas where color chips are to be analyzed and matched. The terminal 501 includes a spectrophotometer 510 which is located within the housing of terminal 501. The spectrophotometer 510 includes an integrating sphere and a rotating filter wheel (described in subsequent paragraphs herein), as well as light sensors which are connected to a processor within the terminal 501. The spectrophotometer 510 is provided with an opening 511. A surface to be color matched is held in front of the opening 511 which opens to the interior of an integrating sphere. Color analysis and formulations for the mixing of various pigments to obtain a matching color may be generated by a processor internal to the terminal 501 on the basis of color measurements obtained from the color measuring equipment of the spectrophotometer 510.

Figure 13:
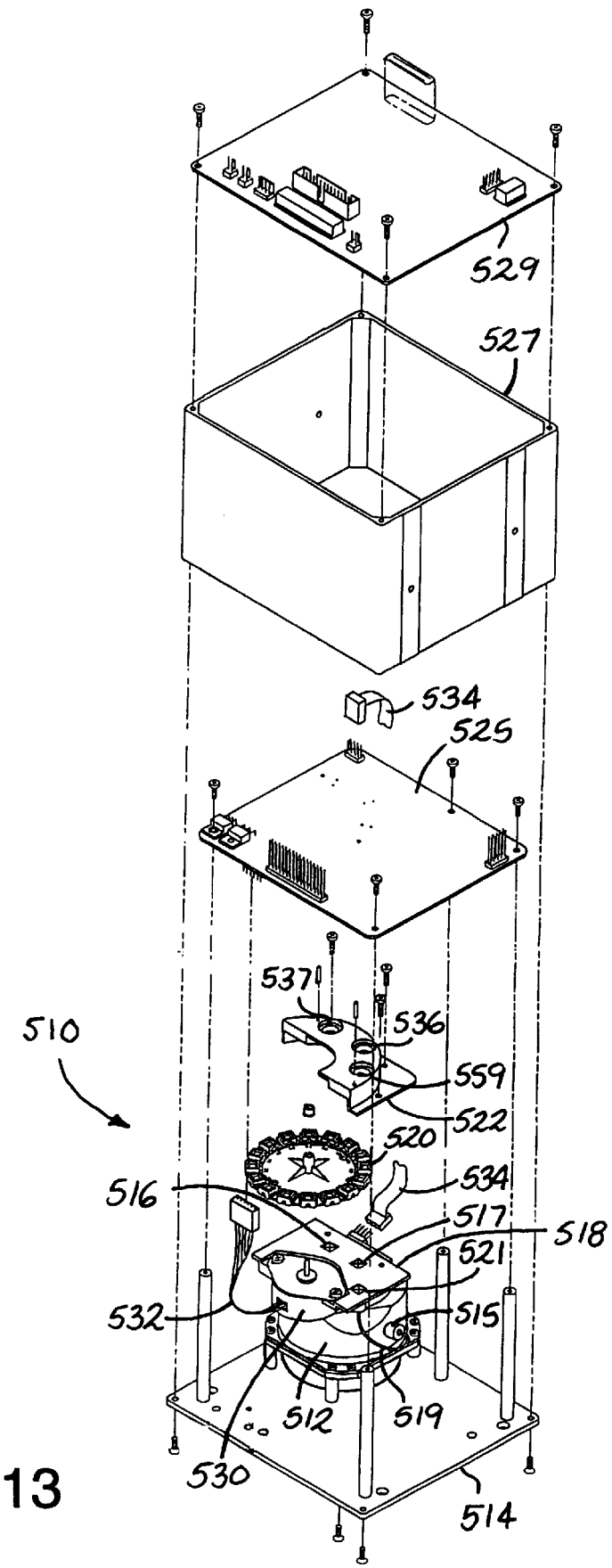
FIG. 13 is an exploded view of the spectrophotometer arrangement of FIG. 12.

FIG. 13 is a perspective exploded view of the spectrophotometer unit 510. As shown in FIG. 13, the unit comprises an integrating sphere 512 mounted on a cover plate 514. As explained further later herein, light is projected from the sphere 512 through a pair of apertures and projected through apertures 516, 517 in a mounting plate 518 mounted on the sphere 512. The light is directed through apertures 516, 517 and, further, through filters of rotating filter wheel 520 and apertures 536, 537 of a light shield 522 onto photoelectric sensors (not shown in FIG. 13) mounted on the lower side of circuit board 525. Light is further conducted from a side sensor 515 via an optical cable 519 through aperture 521, filter wheel 520, aperture 559 and light shield 522 onto an additional electro-optical sensor mounted on the underside of circuit board 525. A motor 530, which drives the filter 520, is supported on mounting plate 518. The motor is connected via electrical cabling 532 to the circuit board 525. Electrical cabling 534, also connected to the circuit board 525, provides electrical power to a lamp (not shown in FIG. 13) internal to the sphere 512. A cover plate 529 mounts to a wall structure 527 which, in turn, is mounted on cover plate 514 to form an enclosure for the sphere 512. Electrical connections are made through the cover plate 529 to the circuit board 525.

Figure 14:
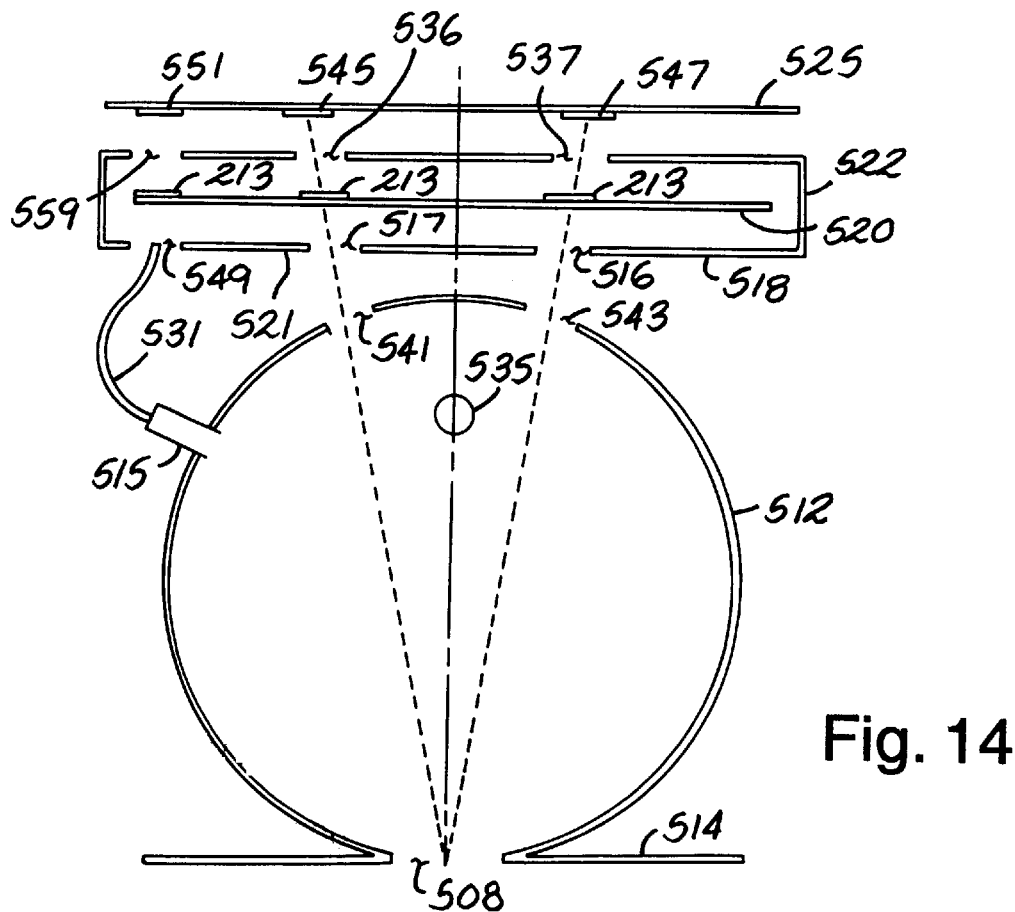
FIG. 14 schematic representation of the integrating sphere and rotating filter wheel.

FIG. 14 is a schematic representation of a portion of the spectrophotometer 510. FIG. 14 depicts the sphere 512 and the opening 508 in the cover plate 514 against which an object to be tested is placed. The construction and operation of the integrating sphere 512 is fully described in U.S. Pat. No. 5,369,481 issued Nov. 29, 1994 and incorporated by reference herein. Referring again to FIG. 14, a lamp 535 provides light which is diffused by reflection within the sphere 512 and components of the diffused light are projected onto an object sample over the opening 508. Sphere 512 is provided with a relatively wide aperture 541 and a smaller aperture 543. A portion of the light projected incident on the sample is reflected from the surface of the sample as specular light and a portion of the incident light is diffused in the sample and reflected as diffuse light. The diffuse and specular light components reflected from the object strike the interior surface of the sphere 512, which serves to provide integrated light. The light received at aperture 541 includes both diffuse light and the specular component surface reflected light. It therefore represents total reflected light which is commonly referred to as specular-included light or "spec-in" light. The aperture 543 is positioned opposite aperture 541 at the same angle from the vertical center line of the sphere. Thus, it is aligned with the angle of incidence of a light component which has a specular angle aligned with aperture 541. Accordingly, at least one component of the diffused source light aligned with aperture 543 is absorbed in aperture 541, and aperture 543 receives only diffuse light from the object sample with respect to the one particular component of the light incident on the object sample. The light received at aperture 543 represents specular excluded or "spec-ex" light. The spec-in and the spec-ex light from the object sample is projected simultaneously through apertures 541 and 543, respectively, of the sphere 512. The same light is projected through apertures 517 and 516, respectively, of the mounting plate 518, through individual filters of the filter wheel 520 and apertures 536, 537 of light shield 522 and onto individual photodetector sensors 545 and 547, respectively, mounted on the lower side of circuit board 525. Light detected by side sensor 515 is conducted via a fiber optic cable 531 through an aperture 549 in mounting plate 518, through one of the filters of the filter wheel 520 and aperture 549 of light shield 522, onto a photodetector sensor 551 on the lower side of circuit board 525.

As described earlier herein, the filter wheel 520 comprises a number of individual interference filters 213 circumferentially spaced apart on the filter wheel. Each of the filters 213 passes light at a different wavelength. The filter wheel 520 may be provided with 16 filters to measure light at wavelengths from 400 nanometers to 700 nanometers, at 20 nanometer intervals. The sensors 545, 547 are connected to a system processor (not shown in the drawing) which collects data from the sensors 545, 547 representative of light intensity at each of the wavelengths defined by the filters to generate color defining data in a standard and well-known fashion. The processor may collect data from the sensors over several revolutions of the rotating wheel 520 in order to derive an average value of spec-in and spec-ex light. In this manner, the processor is able to define color of an object sample with greater accuracy by obtaining simultaneous readings of both spec-ex and spec-in from the object by a direct specular reading of the light.

As earlier mentioned, FIG. 14 shows the side sensor 515. Light from sensor 515 is conducted via optical cable 531 through aperture 549 and projected through one of the filters 213 of the rotating filter wheel 520 and aperture 559 of light shield 522 onto sensor 551. The side sensor provides a reference beam for use by the system processor as a measure of the intensity of the light source. In the arrangement of the present invention, spec-in, spec-ex and reference light may be read simultaneously through different filters of the filter wheel, thereby avoiding errors which may be introduced through changes in light conditions or physical position of a filter when the measurements are made at different times.

Figure 15:
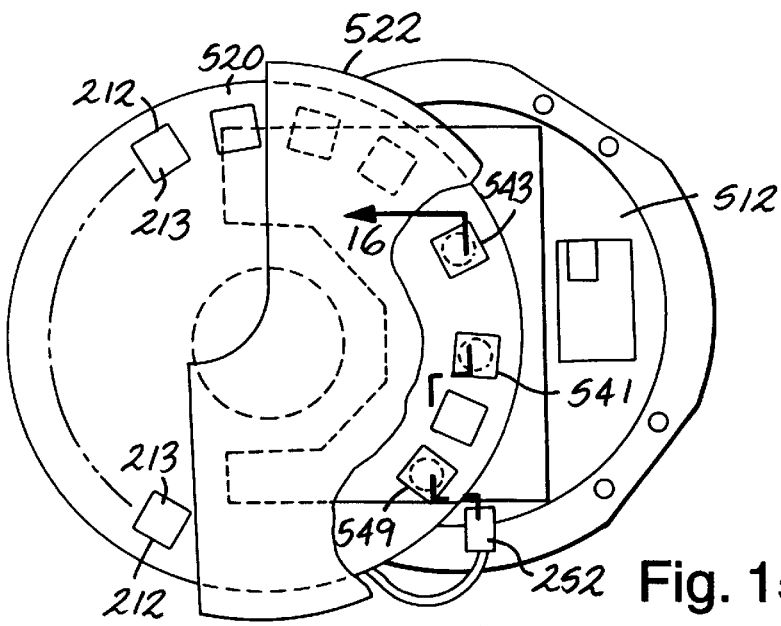
FIG. 15 a partial cutaway plan view of the filter wheel and integrating sphere.

FIG. 15 is a partial plan view of the combination of the integrating sphere 512 with the rotating filter wheel 520. As apparent from the drawing, the center of the filter wheel 520 is offset from the center of the sphere 512. This offset allows for alignment of the apertures 541, 543 and 549 with filters of the filter wheel 520. A portion of the light shield 522 is shown cutaway in FIG. 15 to more clearly show the alignment of the apertures 541, 543 and 549 with filters of the filter wheel 520. The individual filters of the filter wheel 520 are the interference filters 213, described earlier herein, and are mounted on the wheel 520 by means of filter housings 212 shown in FIGS. 6 and 7.

Figure 16:
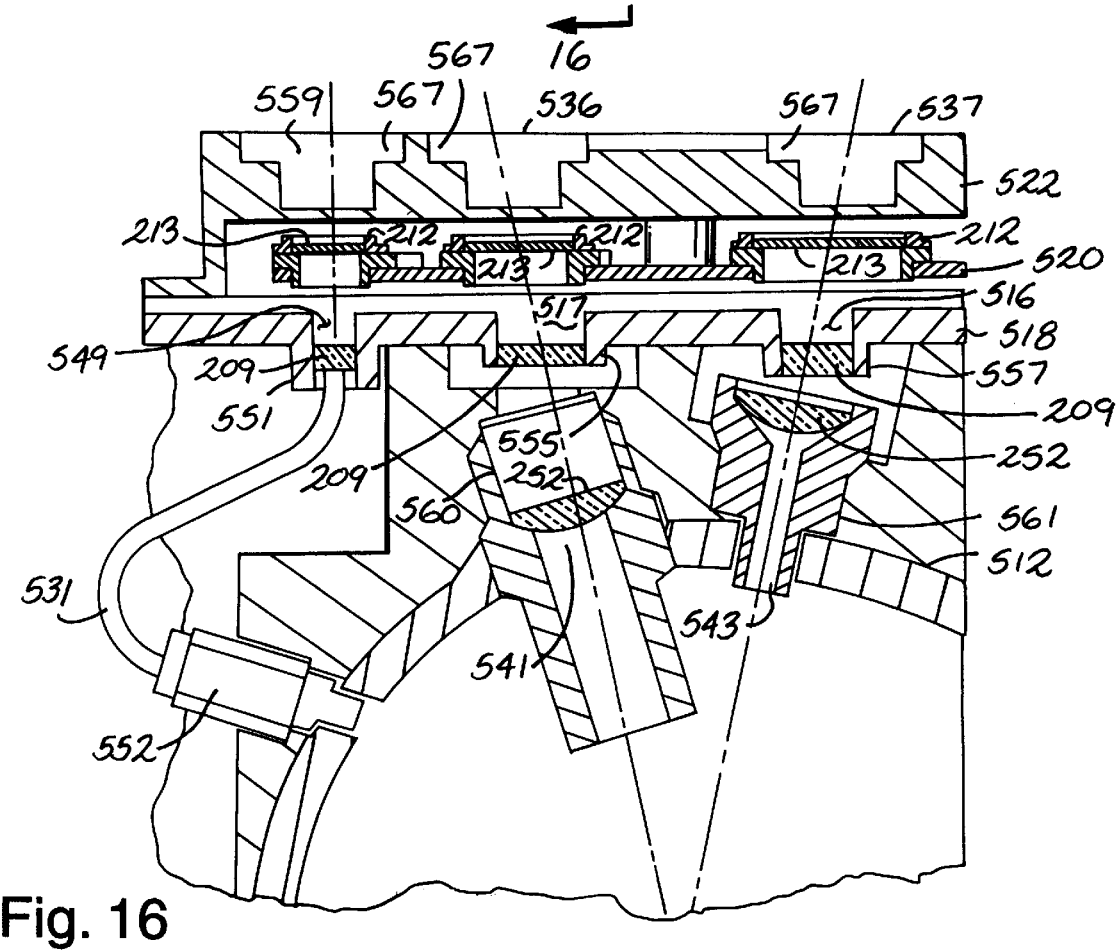
FIG. 16, is a cross-sectional view along line 16—16 of FIG. 15.

FIG. 16 is a cross-sectional view along line 16—16 of FIG. 15 and shows in greater detail the alignment of apertures in the integrating sphere 512 with apertures in the mounting plate 518, as well as apertures in the light shield 522. The centers of apertures 541, 543 in the sphere 512 are displaced equally apart from a centerline of the sphere at a predefined angle, e.g. 8 degrees. The aperture 541, receiving total reflected light, is considerably larger than aperture 543 receiving only diffused light, without the specular component of the reflected light, to facilitate exclusion of the specular component. The interior of the sphere may be coated with a highly reflective inner coating, which is preferably spectrally flat. The aperture 541 comprises an aperture structure which preferably has a blackened appearance to absorb the spectral component reflected from the object sample along the angle of the aperture. An aperture extension 560 extends external to the sphere and is directed to aperture extension 555 in mounting plate 518. The aperture extension is formed in this manner to minimize the introduction of extraneous light. Aperture 517 contains a common blocking filter, filter 209 in FIG. 2, which blocks light outside of the 400–700 nanometer range. Aperture 516 conducts light from aperture 543 onto one of the interference filters 213. In a similar fashion, aperture 543 is provided with an extension 561 and aperture 516 is provided with an extension 557 to minimize the entry of extraneous light. Aperture 516 also contains a common blocking filter 209. Aperture extensions 560 and 561 are provided with lenses 252 to provide high intensity light beams to the filter 213 and photodetectors mounted on circuit board 525 (not shown in FIG. 16). Fiberoptic cable 531 is connected to sphere 512 via connector 552 and to mounting plate 518 via connector 551.

Aperture 549 is provided with a common blocking filter 209. The light shield 522 generally serves to prevent extraneous light from entering into the measuring apparatus. The shield 522 is provided with indentations 567 in apertures 531, 536 and 537 which accommodate sensors mounted on the lower side of circuit board 525.

Figure 17:
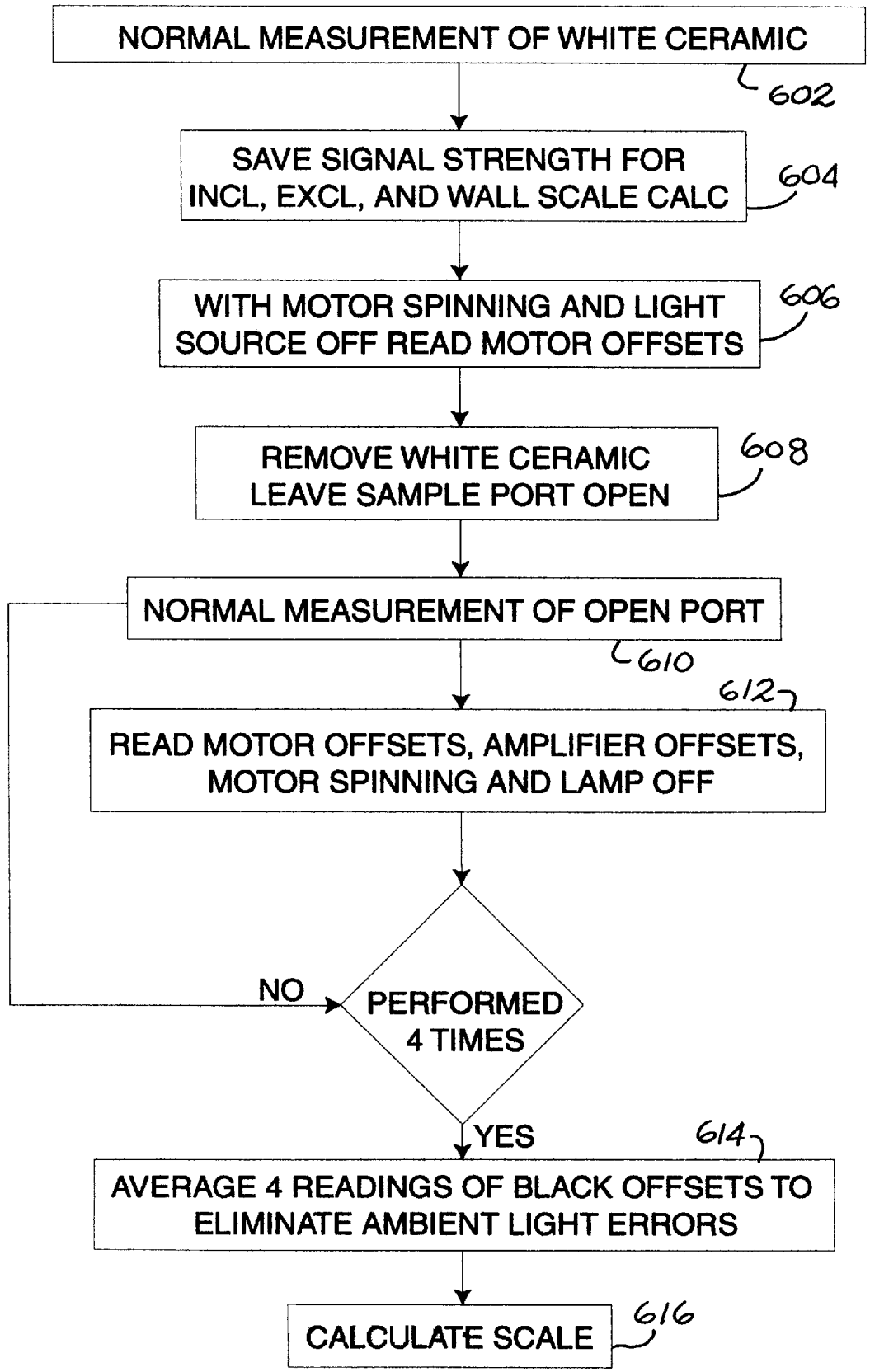
FIG. 17 is art example of a sequence diagram for calibration associated with the integrating sphere spectrophotometer.
Figure 18:
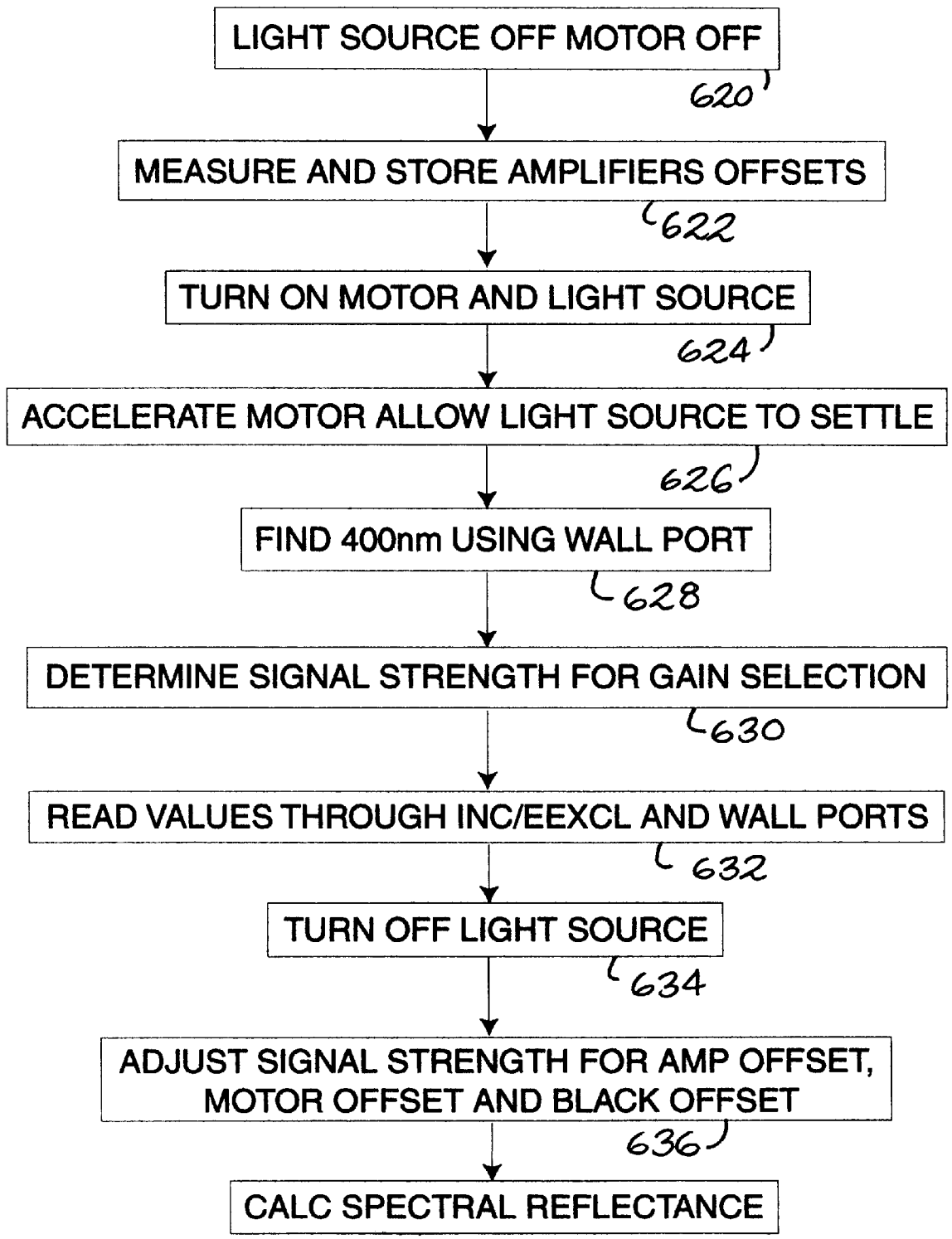
FIG. 18 is a sequence diagram showing operation of the integrating sphere spectrophotometer, with calculation of spectral reflectance based on calibration and compensation techniques.

To enhance the accuracy of the color measuring spectrophotometers in accordance with the invention, calibration and compensation techniques can be employed to compensate for variables associated with the filters, motor, amplifiers, ambient light, lamp intensity and other electro-optical components. An exemplary sequence of steps to perform a calibration and to compensate measured reflectance values for these variables is illustrated in "flow chart" form in FIGS. 17 and 18. The actual performance of these functions is preferably carried out through microprocessor or other similar control apparatus with conventional program control techniques. Most of the functions illustrated in FIGS. 17 and 18 are performed for each position of the rotating filter wheel, and therefore, each wavelength interval. In these drawings and this description, the "wall port" refers to the side sensor port. Also in the drawings, "INCL" refers to the spec-in port, while "EXCL" refers to the spec-ex port. Turning specifically to FIG. 17, the drawing illustrates an exemplary embodiment of a sequence of functions to be performed for purposes of calibration. First, as shown by sequence step 602, a reference sample, commonly referred to as a "white ceramic," may be utilized by the operator, in place of an actual object sample to be tested. Turning specifically to FIG. 17, with respect to performance of sequence function 602, normal reflectance measurements are made of the white ceramic with respect to the INCL, EXCL and wall ports. Signal strengths for these ports are then stored in memory for purposes of subsequent scale calculations. This process is shown in sequence step 604.

In sequence step 606, reference is made to the concept that the light source is maintained in an "off state," and the motor is enabled so as to appropriately rotate the filters. With the filter wheel rotating and the lamp in an off state, "motor offset" signals are obtained. Thereafter, as shown in sequence step 608, the reference white ceramic is removed, and the sample port is maintained open, with no object sample being utilized. Pursuant to sequence step 610, normal measurements are then obtained for the INCL, EXCL and wall ports. Motor offsets and amplifiers offsets are then obtained with the sample removed, the filter wheel in a rotating state and the light source being in an off state. This particular function is performed several times (namely, four times in the sequence step 612 shown in FIG. 17).

Following these particular measurements of the motor and amplifier offsets, an average is taken of the "black" offsets for purposes of eliminating ambient light errors. For purposes of this description, "black" offsets refer to measurements undertaken with the lamp in an off state. In this regard, for each wavelength interval L representing a particular filter, a determination is made of a calibration value which can be characterized as the "black" signal strength which is included for a particular wavelength and adjusted for calibration utilizing the white ceramic. Such a calculation can be performed as follows:

$$BWISL = (BISL \times WWSL)/BWSL \qquad \text{(Equation 1)}$$

where BWISL represents the black signal strength for the spec-in port for a particular wavelength L, and adjusted for white ceramic calibration, BISL represents the black spec-in strength for a particular wavelength L, WWSL represents the measured reflectance values for the wall port with the white calibration ceramic, and BWSL represents the signal strength for the wall port in the "black" state. Correspondingly, an adjustment or offset can be calculated for the spec-ex port for the black values, as adjusted with the white calibration sample, in accordance with the following:

$$BWESL=(BESL \times WWSL)/BWSL \qquad \text{(Equation 2)}$$

where BWESL represents the calibrated black signal strength for the spec-ex port, with adjustment for the white calibration sample and BESL represents the signal strength for the spec-ex port for the black state for the given wavelength L.

Following these particular calculations scale factor calculations can be performed as shown by sequence step 616. More specifically, a scale factor ESCL can be obtained which represents a scale factor for the spec-ex port, while ISCL represents a scale factor for the spec-in port. The scale factor ISCL for the spec-in port can be calculated as follows:

$$ISCL=(WIRL \times WWSL)/(WISL-BWISL) \qquad \text{(Equation 3)}$$

where WIRL represents the measured reflectance values for the spec-in port with the white calibration sample for a given wavelength interval L, and WISL represents the signal strength for the spec-in port associated with the white calibration sample for the wavelength interval L. Correspondingly, the scale factor ESCL can be calculated as follows:

$$ESCL=(WERL \times WWSL)/(WESL-BWESL) \qquad \text{(Equation 4)}$$

where WERL represents the spec-ex measured reflectance values using the white calibration sample for wavelength interval L, and WESL represents the spec-ex measured reflectance value using the white calibration sample for the given wavelength interval L.

The foregoing is merely an example of a particular type of calibration which can be employed with the spec-in, spec-ex and wall ports in accordance with the invention. FIG. 18 represents an exemplary sequence diagram for the normal operation of a spectrophotometer in accordance with the invention following the calibration function. With reference to FIG. 18, sequence step 620 illustrates the concept of first turning off the light source and the motor. With the light source and motor in off states, and as shown by sequence step 622, amplifier offsets are then measured and stored in memory for later use in calculations for compensation. As shown by sequence step 624, the motor is then enabled, thereby rotating the filter wheel, and the light source is also enabled. Pursuant to sequence step 626, the motor is allowed to accelerate so as to ensure that the filter wheel is accelerated to an appropriate constant rotation. Correspondingly, time is allowed for the light source to settle as to temperature and intensity.

As shown by sequence step 628, a determination is then made of the particular filter associated with the 400 nanometer interval, utilizing the wall or side sensor port. As shown in sequence step 630, a determination is then made of signal strength for purposes of determining gain selection. In accordance with the sequence step 632, reflectance values are then determined for each wavelength interval through the spec-ex, spec-in and wall ports. Preferably, these measurements are determined over several cycles. As shown in sequence step 634, the light source is then disabled. In accordance with sequence step 636, adjustments or compensation is then made for the signal strengths for the amplifier offsets, motor offsets and "black" offsets. As an example, if the spec-in signal strength for a given wavelength interval L is characterized as ISL, this adjustment comprises the actual measured ISL, less the amplifier offset and less the spec-in motor offset for the given wavelength interval L. Correspondingly, with the spec-ex signal strength characterized as ESL, the adjusted strength can be calculated as the actual measured ESL, less the amplifier offset and less the spec-ex motor offset. Correspondingly, with the wall signal strength characterized as WSL, this adjustment can be characterized as the measured WSL, less the amplifier offset and less the wall motor offset for the given wavelength L. Following these adjustments, the actual measured reflectance values can then be determined utilizing the particular compensation and scale values obtained in accordance with the sequence steps illustrated in FIGS. 17 and 18. For example, if the spec-in compensated reflectance is characterized as IRL for a given wavelength interval L, the calculated reflectance can be characterized as a function of ISL, BWISL, WSL, WWSL and ISCL. Correspondingly, with the spec-ex reflectance as appropriately calculated characterized as ERL, this particular compensated value can be determined as a function of ESL, BWESL, WSL, WWSL and ESCL. In accordance with all of the foregoing, for each filter, calibration and scale factors are determined for purposes of compensating actual reflectance measurements for the variables associated with the mechanical and electro-optic components of the spectrophotometers in accordance with the invention. It should also be mentioned that when a spectrophotometer in accordance with the invention is used for the measurement of incident light from a source such as a CRT, light sampled during reflection calibration can be compared to light from a calibrated CRT, and the unit can be factory calibrated for light intensity measurements.

Concepts associated with compensation for changes in light intensity and calculation of scale factors as associated with spectrophotometers are disclosed in the commonly assigned and co-pending application Ser. No. 07/975,981, filed Nov. 13, 1992. However, it should be emphasized that the specific lamp compensation and calibration formulae and general processes disclosed in the aforedescribed pending application differ from the calibration and compensation methods described herein.

It will be understood that the above-described arrangement is merely illustrative of the application of the principles of the invention and that other arrangements may be devised by those skilled in the art without departing from the scope of the invention as defined by the appended claims.

The embodiments of the invention in which an exclusive property or privilege is claimed are defined as follows:

1. Portable color measuring apparatus comprising:
   a wheel having an axis of rotation;
   an electric motor operably connected to the wheel to rotate the wheel about the axis of rotation at a constant speed through a plurality of revolutions;
   an aperture disposed on one side of the wheel;
   a photoelectric primary sensor disposed on an other side of the wheel, the aperture and the sensor defining a light path;
   a plurality of light filters, each having predetermined wavelength characteristics, disposed on the wheel and spaced apart along a circumferentially extending line on the wheel, one of the filters being a low wavelength filter and another of the filters being a high wavelength filter, the circumferentially extending line intersecting the light path, whereby light from an object sample aligned with the aperture conducted in the light path is projected through individual ones of the filters onto the sensor as the wheel is rotated about its axis of rotation;

the primary sensor operative to generate electrical output signals representative of the intensity of light projected through each of the plurality of filters as the wheel is rotated at the constant speed; and signal processing circuitry connected to the primary sensor and responsive to the electrical signals as the wheel is rotated through the plurality of revolutions for determining the relative position of the filters with respect to the primary sensor by detecting the occurrence of a significant difference in intensity between light passed through the low wavelength filter and the high wavelength.

2. The apparatus in accordance with claim 1 wherein the signal processing circuitry further includes means responsive to the electrical signals generated by the primary sensor for generating output signals representative of spectral information of light conducted in the light path.

3. The apparatus in accordance with claim 1 wherein the light path comprises a optical conduit having a plurality of circumferentially extending baffles.

4. The apparatus in accordance with claim 3 wherein the conduit comprises two joined semicircular molded halves, each half having a plurality of molded baffles which form the circumferentially extending baffles when the halves are joined to form the optical conduit.

5. The apparatus in accordance with claim 3 wherein the conduit comprises an optical lens.

6. The apparatus in accordance with claim 1 wherein the plurality of light filters have predetermined filter characteristics within a specified range of wavelengths and the optical path further comprises a blocking filter having filtering characteristics such that light at wavelengths outside the predetermined range is blocked from reaching the plurality of filters disposed on the wheel.

7. The apparatus in accordance with claim 1 and further comprising a light source comprising a plurality of spaced apart lamps each emitting light along a light projection line extending at a predetermined angle to a line extending through the light path and the aperture, whereby an object sample disposed in alignment with the aperture is illuminated and light reflected from the object sample is conducted through the light path and the filters onto the sensor.

8. The apparatus in accordance with claim 7 wherein the light source comprises three lamps circumferentially spaced apart from each other by 120 degrees.

9. The apparatus in accordance with claim 7 wherein the aperture has one side facing in the direction of the wheel and an other side facing away from the wheel and wherein the light projection lines intersect at a point disposed adjacent the other side of the aperture and removed from the aperture by a predetermined distance.

10. The apparatus in accordance with claim 7 wherein the filters are each spaced apart from adjacent filters by a predetermined distance, the apparatus further comprising a photoelectric side sensor disposed on the other side of the wheel and spaced apart from the primary sensor by a distance corresponding to an integral multiple of the predetermined distance by which the filters are spaced apart and wherein at least one of the lamps is positioned relative to the side sensor and the filters such that light from the at least one lamp is projected through the filters and onto the side sensor as the wheel is rotated about its axis of rotation.

11. The apparatus in accordance with claim 10 and further comprising a lamp support housing and wherein the lamps are disposed in the lamp support housing, the lamp support housing comprising a light channel extending from the at least one lamp in the direction of the side sensor.

12. The apparatus in accordance with claim 1 and further comprising a plurality of filter holders mounted on the wheel and each comprising a lower housing and a removable cover and wherein each of the filters is retained in one of the filter holders.

13. The apparatus in accordance with claim 12 wherein the filters are rectangularly shaped nonhygroscopic filters.

14. The apparatus in accordance with claim 2 and further comprising a power source and a voltage reference circuit and a plurality of lamps connected to the power source in a series circuit, the series circuit further comprising a voltage control transistor connected to the voltage reference circuit.

15. The apparatus in accordance with claim 2 wherein the circuitry further comprises an integrator circuit having an input terminal and an output terminal and a capacitor having opposite sides connected to the input terminal and output terminal, respectively, and a switch connected between the opposite sides of the capacitor, the switch operable between an first position allowing the capacitor the capacitor to be charged by the integrator and a second position discharging the capacitor.

16. The apparatus in accordance with claim 15 and further comprising a light source and a photoelectric side sensor disposed in a position relative to the light source to receive illumination from the light source through the plurality of light filters when the wheel is rotated about its axis of rotation, the apparatus further comprising a reference source of a predetermined voltage and a comparator circuit connected to the side sensor and the reference and generating a synchronization output pulse when a signal from the side sensor exceeds the predetermined voltage.

17. The apparatus in accordance with claim 16 and further comprising a control circuit responsive to the synchronization output pulse to control operation of the switches.

18. The apparatus in accordance with claim 1 and further comprising:

projecting a reference light beam along a reference light path through filters of the wheel onto a secondary sensor; and generating a synchronization signal in response to the secondary sensor in synchronism with a light beam projected onto the primary sensor.

19. Color measuring apparatus comprising:

a rotatable filter wheel having an axis of rotation and a plurality of light filters disposed on the wheel and spaced apart along a circumferentially extending line on the wheel, each of the filters passing light at a predetermined wavelength, one of the filters being a low wavelength filter and the other of the filters being a high wavelength filter;

first and second apertures;

the filter wheel disposed relative to the first and second apertures are aligned with the circumferentially extending line and light conducted through the first and second apertures is projected through the filters of the filter wheel;

an electric motor operably connected to the filter wheel to rotate the filter wheel at a constant speed through a plurality of revolutions;

first and second light sensors for sensing light conducted through the first and second apertures, respectively, as the filter wheel is rotated at the constant speed, the light sensors operative to generate electrical signals representative of the intensity of light received by the sensors through each of the filters as the wheel is rotated at the constant speed, the first aperture and the first sensor defining a first light path, the second aperture and the second sensor defining a second light path; and signal processing circuitry means connected to the light sensors and responsive to the electrical signals as the wheel is rotated through the plurality of revolutions for determining the relative position of the filters with respect to the sensors by detecting the occurrence of a significant difference in intensity between light passed through the low wavelength filter and the high wavelength filter.

20. The apparatus in accordance with claim 19 and further comprising a circuit board and wherein the light sensors comprise photo-electric sensors disposed on the circuit board and in alignment with the first and second apertures.

21. The apparatus in accordance with claim 20 light along the first and second light paths is simultaneously projected through individual ones of the filters of the filter wheel and onto individual ones of the photo-electric sensors.

22. The apparatus in accordance with claim 21 and further comprising light shield means for reducing the exposure of the filters to extraneous light.

23. The apparatus in accordance with claim 22 and further comprising a mounting plate supporting the electric motor the mounting plate comprising apertures disposed in alignment with the first and second apertures.

24. The apparatus in accordance with claim 23 wherein the light shield comprises a side wall extending upwardly from the mounting plate.

25. The apparatus in accordance with claim 23 and further comprising aperture extensions extending between the first and second apertures and the apertures in the mounting plate, whereby the aperture extensions serve to reduce the entry of extraneous light into the apertures in the mounting plate.

26. The apparatus in accordance with claim 19 and further comprising calibration and compensation means for compensating color measurements of the object to be tested for variables associated with mechanical, electrical and optical components of the apparatus.

27. The apparatus in accordance with claim 26, wherein the calibration and compensation means comprises means for adjusting signal strength measurements for amplifier and motor offsets.

28. The apparatus in accordance with claim 26, wherein the calibration and compensation means comprises means for calculating scale factors associated with specular-included and specular-excluded reflectance values for given wavelength intervals, based on reference sample measurements and measurements in the absence of a projected light source.

29. The apparatus in accordance with claim 26, wherein the calibration and compensation means comprises means for calculating specular-included reflectance values and specular-excluded reflectance values as a function of actual calculated scale values, actual reflectance measurements, amplifier offsets and motor offsets.

30. A method of measuring color of an object sample comprising:

projecting light from a light source onto the object sample;

directing light reflected from the object sample toward a photoelectric sensor generating electrical output signals representative of the intensity of light received by the sensor;

interposing a filter wheel having an axis of rotation and a plurality of light filters between the object sample and the photoelectric sensor, the filters being disposed on the wheel along a circumferentially extending line in alignment with the photoelectric sensor, each filter passing light at a predefined wavelength, one of the filters being a low wavelength filter and the another of the filters being a high wavelength filter;

rotating the filter wheel about the axis of rotation at a constant speed through a plurality of revolutions;

reading the electrical output signals corresponding to the light passed through each of the filters as the filter wheel is rotated at the constant speed through the plurality of revolutions; and determining the relative position of the filters with respect to the photoelectric sensor by detecting the occurrence of a significant difference in intensity between light passed through the low wavelength filter and the high wavelength filter.

31. The method in accordance with claim 30 and further comprising the step of storing optical data related to light detected by the sensor in a storage device in a time period in which one of the filters is in alignment with the sensor.

32. The method in accordance with claim 30 and further comprising the step of projecting light from the light source through the filters onto another photoelectric sensor and generating a synchronization signal in synchronism with the rotation of the wheel.

* * * * *

UNITED STATES PATENT AND TRADEMARK OFFICE
CERTIFICATE OF CORRECTION

PATENT NO.   :   6,002,488
DATED        :   December 14, 1999
INVENTOR(S)  :   Bernard J. Berg et al It is certified that error appears in the above-indentified patent and that said Letters Patent is hereby corrected as shown below:

Claim 1, Column 17, Line 15:
  after "wavelength" insert --filter--

Signed and Sealed this

Thirty-first Day of October, 2000

Attest:

Q. TODD DICKINSON

*Attesting Officer*              *Director of Patents and Trademarks*

UNITED STATES PATENT AND TRADEMARK OFFICE
CERTIFICATE OF CORRECTION

PATENT NO.   : 6,002,488
DATED        : December 14, 1999
INVENTOR(S)  : Berg, et al It is certified that error appears in the above-identified patent and that said Letters Patent is hereby corrected as shown below:

Claim 16, Column 18, Line 32: after "reference" insert --source--

Signed and Sealed this

Thirteenth Day of February, 2001

Attest:

NICHOLAS P. GODICI

*Attesting Officer*   Acting Director of the United States Patent and Trademark Office